(12) United States Patent (10) Patent No.: US 12,621,607 B2
Moll et al. (45) Date of Patent: May 5, 2026

(54) OPERATING ACOUSTIC SIGNAL TRANSMITTERS OF A MOTOR VEHICLE

(71) Applicants: Volkswagen Aktiengesellschaft, Wolfsburg (DE); AUDI AG, Ingolstadt (DE)

(72) Inventors: Tobias Moll, Ingolstadt (DE); Mark Bennemann, Falkensee (DE)

(73) Assignees: VOLKSWAGEN AKTIENGESELLSCHAFT, Wolfsburg (DE); AUDI AG, Ingolstadt (DE)

( * ) Notice: Subject to any disclaimer, the term of this patent is extended or adjusted under 35 U.S.C. 154(b) by 276 days.

(21) Appl. No.: 18/550,383

(22) PCT Filed: Mar. 10, 2022

(86) PCT No.: PCT/EP2022/056141
§ 371 (c)(1),
(2) Date: Sep. 13, 2023

(87) PCT Pub. No.: WO2022/194659
PCT Pub. Date: Sep. 22, 2022

(65) Prior Publication Data
US 2025/0234131 A1 Jul. 17, 2025

(30) Foreign Application Priority Data
Mar. 18, 2021 (DE) ..................... 10 2021 106 702.2

(51) Int. Cl.
*H04R 3/12* (2006.01)
*G06F 3/16* (2006.01)
(Continued)

(52) U.S. Cl.
CPC ............... *H04R 3/12* (2013.01); *G06F 3/162* (2013.01); *H04R 5/02* (2013.01); *H04S 7/303* (2013.01);
(Continued)

(58) Field of Classification Search
CPC ........ H04R 3/12; H04R 5/02; H04R 2499/13; H04S 7/302; H04S 7/303; H04S 2400/03; H04S 2400/11
See application file for complete search history.

(56) References Cited

U.S. PATENT DOCUMENTS

| | | | |
|---|---|---|---|
| 10,219,096 B2 | 2/2019 | Volkmar et al. | |
| 10,418,019 B1 * | 9/2019 | Murad | G10K 11/1754 |

(Continued)

FOREIGN PATENT DOCUMENTS

| | | |
|---|---|---|
| CN | 103733647 A | 4/2014 |
| CN | 108476357 A | 8/2018 |

(Continued)

OTHER PUBLICATIONS

German Office Action, Application No. 102021106702.2, 5 pages, Nov. 2, 2021.

(Continued)

*Primary Examiner* — Jason R Kurr
(74) *Attorney, Agent, or Firm* — Slayden Grubert Beard PLLC

(57) ABSTRACT

A method for operating a plurality of acoustic signal transmitters of a motor vehicle is disclosed, wherein booking information is obtained from an external computing unit by means of a control system of the motor vehicle. By means of the control system, a first part of the plurality of acoustic signal transmitters is deactivated depending on the booking information. By means of the control system, a control signal is generated for each of the acoustic signal transmit- (Continued)

ters of a second part of acoustic signal transmitters to generate an acoustic output.

19 Claims, 1 Drawing Sheet

(51) Int. Cl.
  *H04R 5/02*      (2006.01)
  *H04S 7/00*      (2006.01)
(52) U.S. Cl.
  CPC ....... *H04R 2499/13* (2013.01); *H04S 2400/11* (2013.01)

(56)          References Cited

U.S. PATENT DOCUMENTS

| | | | | |
|---|---|---|---|---|
| 11,818,538 | B2 * | 11/2023 | Ludwig ................. | B60K 35/10 |
| 2012/0197637 | A1 | 8/2012 | Gratke et al. ................. | 704/226 |
| 2014/0309862 | A1 | 10/2014 | Ricci ............................... | 701/36 |
| 2017/0323639 | A1 | 11/2017 | Tzirkel-Hancock et al. | |
| 2019/0116421 | A1 * | 4/2019 | Kano ........................ | H04R 3/04 |
| 2021/0086704 | A1 * | 3/2021 | Sakaue ..................... | H04R 3/12 |
| 2021/0179117 | A1 * | 6/2021 | Glazman ............. | B60R 21/0136 |
| 2021/0297769 | A1 * | 9/2021 | Brummer .............. | B60W 50/14 |
| 2024/0114308 | A1 * | 4/2024 | Seefeldt .................. | H04S 7/303 |

FOREIGN PATENT DOCUMENTS

| | | | | |
|---|---|---|---|---|
| DE | 102016213313 | A1 | 1/2018 | ............. B60R 16/02 |
| EP | 3842937 | A1 | 6/2021 | ............. G06F 21/10 |
| WO | 2012/172394 | A1 | 12/2012 | |
| WO | 2020/060884 | A1 | 3/2020 | ............. B60N 2/02 |
| WO | 2022/194659 | A1 | 9/2022 | ............. H04R 3/12 |

OTHER PUBLICATIONS

International Search Report and Written Opinion, Application No. PCT/EP2022/056141, 14 pages, Jul. 6, 2022.

Chinese Office Action, Application No. 202280021540.0, 10 pages, Mar. 10, 2026.

* cited by examiner

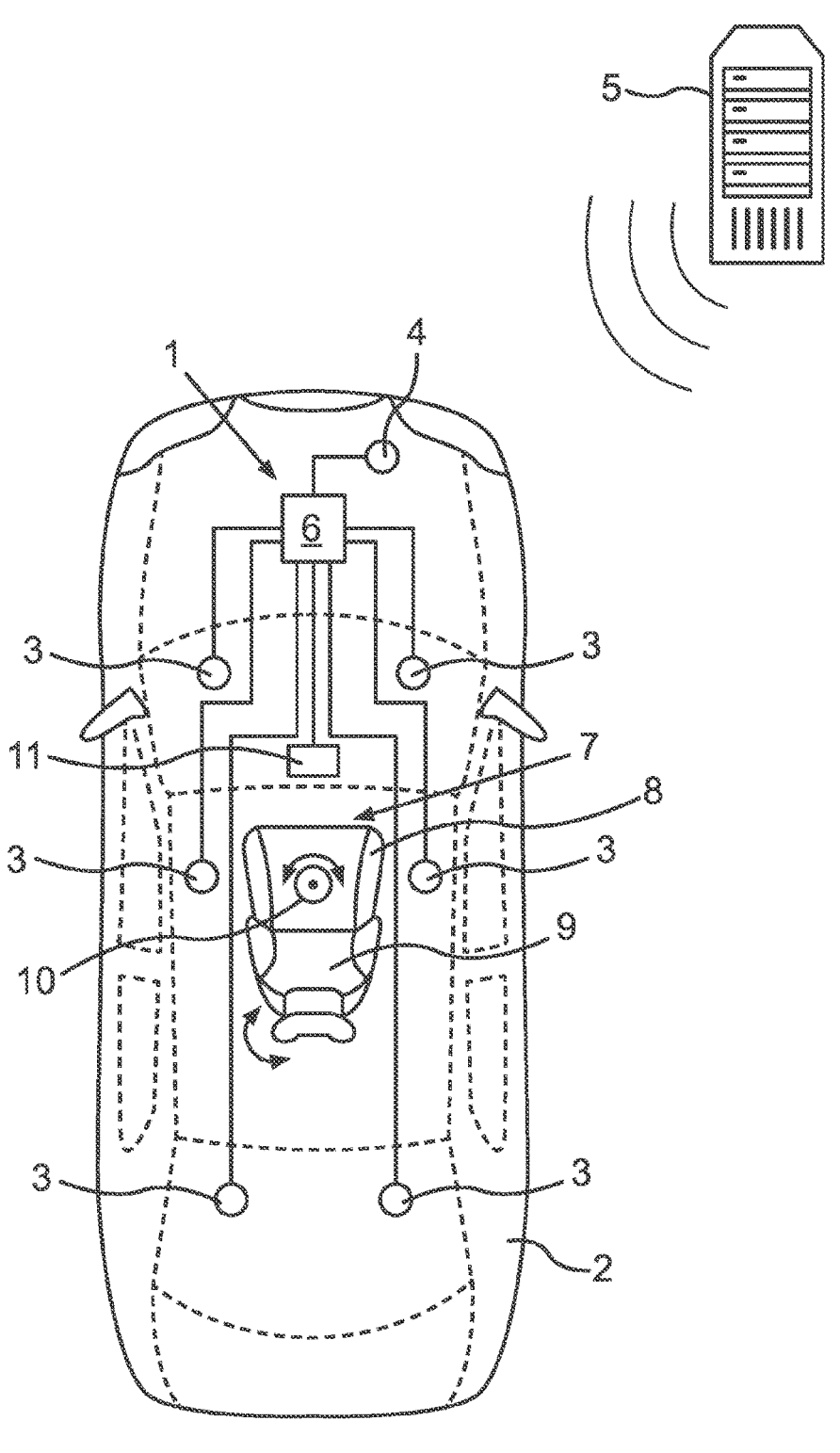

OPERATING ACOUSTIC SIGNAL TRANSMITTERS OF A MOTOR VEHICLE

CROSS-REFERENCE TO RELATED APPLICATIONS

This application claims priority to German Patent Application No. DE 10 2021 106 702.2, filed on Mar. 18, 2021 with the German Patent and Trademark Office. The contents of the aforesaid Patent Application are incorporated herein for all purposes.

TECHNICAL FIELD

The present invention relates to a method for operating a plurality of acoustic signal transmitters of a motor vehicle, to a control system for a motor vehicle with a plurality of acoustic signal transmitters as well as to a motor vehicle with such a control system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern motor vehicles comprise a plurality of acoustic signal transmitters, for example speakers, to allow a sound experience of the passengers as comfortable and pleasant as possible. By the combination of the different acoustic signal transmitters, a complex spatial sound field can for example be generated. Therein, the superposition of all of the sound waves generated by the acoustic signal transmitters can for example be understood by a sound field.

Against the background of the common use of one or more motor vehicles by multiple passengers, for instance in context of car sharing offers, for passenger transport or the like, it is desirable to be able to generate different individual sound impressions.

SUMMARY

A need exists to provide an improved operation of a plurality of acoustic signal transmitters of a motor vehicle, which allows a more flexible configuration of the sound field in the motor vehicle.

The need is addressed by the respective subject matter of the independent claims. Embodiments of the invention are described in the dependent claims, the following description, and the drawings.

BRIEF DESCRIPTION OF THE DRAWING

FIGURE a schematic representation of a motor vehicle with an embodiment of a control system.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

The teachings herein are based on the idea to deactivate a part of the plurality of acoustic signal transmitters depending on booking information, which is obtained from an external computing unit.

In some embodiments a method for operating a plurality of acoustic signal transmitters, thus in particular three or more acoustic signal transmitters, of a motor vehicle is specified. Therein, booking information is obtained from an external computing unit by means of a control system of the motor vehicle, for example by means of a communication interface of the control system and/or a control unit of the control system. By means of the control system, in particular by means of the control unit, a first part of the plurality of acoustic signal transmitters is deactivated depending on the booking information. By means of the control system, a control signal is generated for each of the acoustic signal transmitters of a second part of acoustic signal transmitters of the plurality of acoustic signal transmitters, which includes at least two of the plurality of acoustic signal transmitters, to generate an acoustic output, in particular in an interior of the motor vehicle or in the interior of a vehicle cabin of the motor vehicle.

The external computing unit can in particular be understood as external in the sense that it is not part of the motor vehicle. For example, the external computing unit can correspond to a server computing unit or a computing unit of a mobile electronic appliance, for instance a mobile phone, a smartphone, a notebook computer or the like.

In particular, the acoustic signal transmitters are arranged distributed in an interior of the motor vehicle. They can for example be designed as speakers, thus be configured to emit sound waves depending on the corresponding control signal. The acoustic signal transmitters can also be designed as signal transmitters for bone conduction, thus be configured to generate mechanical oscillations depending on the corresponding control signal, substantially without therein emitting sound waves. The mechanical oscillations can be conducted into the internal ear of a passenger via the cranial bone of the passenger. In other words, the designation "acoustic" can be construed such that it relates to the sense of hearing of the passenger.

The acoustic signal transmitters can also be designed as so-called active areas or area elements. Herein, surfaces of extended objects, for instance panes or trim components or the like, are specifically mechanically oscillated or vibrated, similar to a membrane at a speaker. However, the oscillations or vibrations can herein be generated by mechanical action on the extended object.

In particular, the booking information can be understood as booking information in context of an offer for collective use of the motor vehicle, also referred to as car sharing. For example, the booking information can include information relating to an identity of a passenger, corresponding authorization information, information relating to a start location and/or a destination, information relating to a booking period of time or a start point of time of the booking and/or information relating to further booking options, such as for example comfort functions, multimedia offers and so on.

The booking information, in particular the further booking options, includes information, which specifies, how many and/or which acoustic signal transmitters of the plurality of acoustic signal transmitters of the motor vehicle are to be deactivated during the use by the passenger, in other words, how the acoustic signal transmitters are to be divided. Thereto, the booking information can for example include a parameter, which can take two or more values, wherein each of the two or more values corresponds to a certain number of acoustic signal transmitters to be deactivated. If the parameter for example has a first value, thus, this can correspond to a booking option, in which none of the acoustic signal transmitters is to be deactivated. In this case, the second part of acoustic signal transmitters is equal to the plurality of acoustic signal transmitters and the first part of acoustic signal transmitters does not contain any acoustic signal transmitter. If the parameter takes a second value, thus, this for example corresponds to a booking option, in which one or more of the acoustic signal transmitters are to be deactivated. In such a situation, the first part of acoustic signal transmitters includes one or more of the plurality of acoustic signal transmitters and the second part of acoustic signal transmitters includes two or more acoustic signal transmitters. In other words, the maximum number of signal transmitters capable of being deactivated is limited in that the second part always includes two or more acoustic signal transmitters. Thereby, it can be ensured that at least a stereo reproduction of the acoustic output is always possible.

Alternatively, the parameter can represent a degree of comfort with respect to the use of the acoustic signal transmitters, for example set by a booked rate for using the motor vehicle. The control system can then determine, for example based on a reference table recorded in the control system, also referred to as look-up table, which ones of the acoustic signal transmitters are to be deactivated.

For example, the value of the parameter can depend on which applications, which require an audio output, the passenger intends to use during the use of the motor vehicle. Alternatively or additionally, the different choice of the parameter value can also be used to adapt an offer and price structure of the car sharing offer. Finally, the parameter can also be selected depending on an intended or expected seat position. If the passenger for example intends to take a lying position during the use of the motor vehicle, other acoustic signal transmitters can be relevant to a comfortable acoustic output than in case of upright seating of the passenger. Thus, a dynamic distribution and adaptation of the acoustic signal transmitters and of the control signals, respectively, can be achieved, for example depending on the rate, the position of the passenger and/or the route during the entire trip.

The booking information can also include information relating to multiple passengers. Thus, the parameter can for example also be selected depending on the number of the expected passengers. For example, if only one passenger is expected, thus, less acoustic signal transmitters can for example be required than in case of multiple passengers.

In this manner, an extremely individualized or flexibilized adaptation of the sound field in the interior of the motor vehicle can be provided depending on externally preset booking information, in particular in context of car sharing offers.

Therein, the control system can in particular include the communication interface for wireless communication with the external computing unit, one or more computing units or control units, electronic control devices and so on.

The deactivation of the acoustic signal transmitters of the first part of acoustic signal transmitters can in particular be understood such that the control system stores corresponding information depending on the booking information, that the acoustic signal transmitters of the first part are not used for acoustic output and that a corresponding control signal is not generated for these acoustic signal transmitters, respectively.

For example, a multimedia system of the motor vehicle can also take an audio and/or video stream from the mobile terminal in corresponding forms of configuration. By specific control of the plurality of signal transmitters, thus, an optimized sound experience can be achieved.

In some embodiments of the method, the control signals are generated depending on the booking information.

Thereby, the type of the control of the signal transmitters of the second part can also be generated by corresponding booking information, booking options and so on.

In some embodiments, the control signals are generated depending on a preset sound profile.

Therein, the sound profile can for example relate to a volume and/or frequency distribution of the sound in a preset spatial area of the motor vehicle. The sound profile can also be designed as an equalizer presetting. Therein, the sound profile can for example also be preset as part of the booking information. Alternatively, the control unit can calculate the sound profile depending on the booking information considering the acoustic signal transmitters available in the respective motor vehicle. Alternatively or additionally, the sound profile can depend on the type of the content reproduced by the acoustic output. For example, other sound profiles can be beneficial for entertainment contents like concerts or movies than for example for performing telephone calls, telephone conferences and so on.

in some embodiments, at least one sensor signal is generated depending on a position and/or orientation of a seat of the motor vehicle by means of a sensor system of the motor vehicle, in particular of the control system. The control signals are generated depending on the at least one sensor signal. The seat can be configured as a vehicle seat or for example as a children's seat.

The position and/or orientation of the seat can correspond to a position and/or orientation of the entire seat or of a component thereof. For example, the position of the seat can be variable in an x-y plane of the motor vehicle, which is perpendicular to a vehicle vertical axis or z-direction of the motor vehicle. By a corresponding translational movement of the seat in the x-y plane, it can for example occur that the sound quality perceived by a passenger on the seat deteriorates. For example, a balance between left and right audio channel can be negatively affected or the quality of a ambient sound, also referred to as surround sound. By the variation of the position, a desired volume in the position of the passenger either can no longer exist. In addition, by the propagation of sound waves depending on frequency, it can occur that the sound impression is impaired.

In addition, it is possible that the seat is rotatable around a rotational axis parallel to the vehicle vertical axis. Thereby, the relative orientation of the individual signal transmitters to the passenger changes such that a former left audio channel is for example generated by a speaker in front of the passenger or the like. In addition, it can for example be possible that the seat is brought into a lying position, for example by changing the position and orientation of the backrest of the seat. Here too, a corresponding influence of the sound quality arises.

By the capture of the position and/or orientation of the seat by means of the sensor system and the corresponding generation of the control signals depending thereon, an optimum sound impression can be achieved even upon change of the seat position.

In particular, the control signals can be continuously adapted to the changing position and/or orientation of the seat during a movement of the seat, thus during a change of the position and/or orientation of the seat, such that the change of the sound impression is not recognizable by the passenger as possible.

For example, the sensor system can include one or more rotary encoders, which are installed in the seat, to be able to determine a rotational position of the seat around the rotational axis and/or a position of the backrest or the like. The sensor system can additionally include one or more cameras in the interior of the motor vehicle and/or one or more microphones in the interior of the motor vehicle, to determine the position and/or orientation of the seat, indirectly via the position of the passenger in the case of microphone recordings, by evaluation of the corresponding camera images and/or microphone recordings. The sensor system can also include one or more pressure sensors, for example for seat occupancy recognition of the seat, to correspondingly verify the occupancy of the seat.

In some embodiments, a rotary encoder signal is generated depending on a rotational position of the seat by means of a rotary encoder of the sensor system, and the control signals are generated depending on the rotary encoder signal. Therein, the rotary encoder signal can be a part of the at least one sensor signal.

In some embodiments, the rotational position corresponds to a rotational angle around a rotational axis, which is at least approximately parallel to a vehicle vertical axis of the motor vehicle.

The rotatability of the seat around the rotational axis is in particular relevant in context of autonomous motor vehicles or other motor vehicles, in which a strict seat specification of the occupants does not exist.

In some embodiments, image data is generated by means of a camera system of the motor vehicle, in particular of the sensor system, which at least partially represents the seat, and in particular a passenger in the seat, and the control signals are generated depending on the image data.

Based on the image data, the control system, in particular the at least one control unit, can for example also infer the rotational position of the seat, a position of the backrest or also a head position or orientation of the passenger, to be able to correspondingly generate the control signals in optimally adapted manner. Based on the image data, a position and/or orientation of the passenger in the seat or of his head or also a body size of the passenger can also be determined and taken into account. For example, the image data can also be evaluated in addition to the rotary encoder signals to correspondingly generate the control signals depending thereon.

In particular, the control unit can continuously adapt the control of the non-deactivated speakers upon a change of the seat position and/or orientation of the seat as well as upon a change of the head position or head orientation of the passenger such that the sound experience remains of high quality as consistently as possible for the passenger.

In some embodiments, a seat occupancy sensor signal is generated depending on a seat occupancy of the seat by means of a seat occupancy sensor of the motor vehicle, in particular of the sensor system, and the control signals are generated depending on the seat occupancy sensor signal.

Therein, the seat occupancy sensor can include one or more pressure sensors, which are installed in the seat.

For example, further seat occupancy sensor signals can also be generated depending on the respective seat occupancy of further seats of the motor vehicle by means of further seat occupancy sensors of the motor vehicle and the control signals can be generated depending on the further seat occupancy sensor signals.

Thus, the sound field generated by the output of the audio signal can be optimally adapted to the number and position of the individual passengers.

In some embodiments, the sensor system can also be used to recognize one or more biometric features of the passenger or passengers. By means of the control unit, it can then for example be verified if a person linked to the booking information is among the passengers and it can exactly then perform the control of the acoustic signal transmitters corresponding to the booking information if this is the case.

The biometric features can for example include an eye color, a face geometry, a body size, a voice characteristic and/or a fingerprint. For example multiple biometric features in combination are used for verification.

Corresponding to the type of the biometric features to be determined, the sensor system can include sensor units suitable thereto. For instance, they can include one or more cameras, for instance for determining the eye color, the face geometry and/or the body size. One or more microphones of the sensor system can be used for determining the voice characteristic and/or a fingerprint sensor for determining the fingerprint.

Alternatively or additionally to the verification based on biometric features, an electronic authentication by mobile electronic appliance of the passenger can also be effected.

According to some embodiments, a control system for a motor vehicle with a plurality of acoustic signal transmitters is also specified. The control system comprises a communication interface, which is configured to obtain booking information from an external computing unit. The control system comprises at least one control unit, which is configured to obtain the booking information via the communication interface and to deactivate a first part of the plurality of acoustic signal transmitters depending on the booking information. The at least one control unit is configured to generate a control signal for each of the acoustic signal transmitters of a second part of acoustic signal transmitters or plurality of acoustic signal transmitters, which includes at least two of the plurality of acoustic signal transmitters, to generate an acoustic output.

The control system does not necessarily include the plurality of acoustic signal transmitters. However, in various embodiments, the plurality of acoustic signal transmitters is part of the control system.

In some embodiments of the control system, the control system comprises a sensor system, which is configured to generate at least one sensor signal depending on a position and/or orientation of a seat of the motor vehicle, and the at least one control unit is configured to generate the control signals depending on the at least one sensor signal.

Further embodiments of the control system directly follow from the different embodiments of the method and vice versa. In particular, the control system can be configured to perform a method according to some embodiments or it performs such a method.

According to some embodiments, a motor vehicle with a plurality of acoustic signal transmitters is also provided. The motor vehicle comprises a control system according to some embodiments.

In particular, the motor vehicle is configured as an automotive motor vehicle.

The invention also includes combinations of one or more features of the described embodiments.

Reference will now be made to the drawings in which the various elements of embodiments will be given numerical designations and in which further embodiments will be discussed.

In the embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGURE.

In the FIGURE, a motor vehicle 2 is schematically illustrated, which comprises a plurality of speakers 3 distributed in the interior, in particular in a passenger cabin, of the motor vehicle 2, as well as an exemplary embodiment of a control system 1. Therein, the control system 1 is in particular capable of performing embodiments of a method according to the teachings herein.

Further, an external server computing unit 5 is schematically illustrated. The control system 1 comprises a communication interface 4 and a control unit 6, which is connected to the communication interface 4. The control unit 6 can wirelessly communicate with the server computing unit 5 via the communication interface 4, in particular via a radio network not illustrated in more detail.

The control unit 6 is connected to the speakers 3 and can control them, thus can generate a corresponding control signal for each of the speakers 3, to generate an acoustic output according to a desired or preset sound field in the interior of the motor vehicle 2.

In addition, the motor vehicle 2 comprises a seat 7, on which a passenger can seat himself during the use of the motor vehicle 2. For example, the seat 7 comprises a seating surface 8 and a backrest 9. In various forms of configuration, the seat 7, in particular the seating surface 8, is rotatable around a rotational axis 10, which is parallel to a vehicle vertical axis of the motor vehicle 2. For example, the backrest 9 can also be adjustable, in particular be inclined with respect to the seating surface 8. In various possibilities of configuration, the backrest 9 can be adjusted such that the passenger can take a lying position in the seat 7.

For example, the motor vehicle 2 can be formed as an autonomous one according to level 5 or as a partially autonomous motor vehicle according to level 4 of the classification according to SAE J3016 of June 2018. Therein, great parts of the driving task or the entire driving task are thus relieved from the driver. Thereby, the passenger can devote himself to other activities, for example mobile working or the consumption of music or videos or also sleep. A strict seat specification, seat position or orientation of the seat 7 during the use is accordingly not preset.

For example, the motor vehicle 2 can be a part of a fleet for collective use of motor vehicles by different persons, for example within the scope of a car sharing offer. Thus, a future passenger can for example perform a booking of the motor vehicle 2 by smartphone app or by web portal or also by analogous means. Booking information like duration of use, identity data or vehicle type can then be stored on the server computing unit 5. The booking information can also relate to further booking options, such as for example an adjustable or selectable level of comfort or audio use level. In particular, the booking information can include a value for a parameter, which specifies, which or how many of the speakers 3 of the motor vehicle 2 are to be or may be used by the passenger upon use of the motor vehicle 2. The control unit 6 receives the booking information from the server computing unit 5 via the communication interface 4. Based on the booking information, the control unit 6 can determine and deactivate a part of the speakers 3 and correspondingly control the remaining speakers 3 by generating an associated control signal, to generate the acoustic output. Alternatively, the passenger can also directly transfer the booking information to the control unit 6 by means of a mobile electronic appliance. A computing unit of the mobile electronic appliance then substitutes the server computing unit 5.

Further, the control unit 6 can differently control the different speakers 3 for example according to position and/or orientation of the seat 7, for example of the seating surface 8 and/or the backrest 9, to achieve an optimum sound experience for the passenger. In particular, the control unit 6 can continuously adapt the control of the non-deactivated speakers 3 upon a change of the seat position and/or orientation of the seat 7 such that the sound experience remains of high quality as consistently as possible for the passenger.

Thereto, the control system 1 can comprise a sensor system 11, which is capable of determining the seat position of the seat 7, thus for example the rotational position around the rotational axis 10. Further, the seat 7 can also be shifted in a plane perpendicular to the rotational axis 10 in various forms of configuration. The sensor system 11 can also recognize a corresponding position of the seat or translational change of the position. Thereto, the sensor system 11 can for example include pressure sensors for recognizing a seat occupancy of the seat 7, one or more rotary encoders, which are installed in the seat 7 or in the backrest 9, one or more microphones, which are installed in the seat 7, for example a headrest of the seat 7, or in another position in the interior of the motor vehicle 2, interior cameras and so on. Besides the position and/or orientation of the seat 7, the sensor system 11 can for example also determine a position and/or orientation of the head or the ears of the passenger.

The control unit 6 is connected to the sensor system 11 and can evaluate the sensor signals correspondingly generated by it to use the control signals for controlling the non-deactivated speakers 3 such that a listening experience as constant as possible results for the passenger, for example before, during and after the change of a position and/or orientation of the seat 7. Alternatively or additionally, the sound impression can also be adapted specified to application, for example depending on whether the passenger reads, sleeps, watches a video and so on. Alternatively or additionally to the sensor signals of the sensor system 11, the control unit 6 can also determine thereto, which applications, for example for media reproduction by a media reproduction system or infotainment system of the motor vehicle 2, are executed to cause a generation of the acoustic output correspondingly specific to application.

By the control system 1 and the method according to the teachings herein, respectively, restrictions of the sound quality for example by the change of the seat position and/or orientation can be avoided. By the adaptation of the control of the non-deactivated speakers 3, an imbalance of right and left audio channel, a stereophonic sound due to a translational movement of the seat 7 and/or a rotational movement of the seat 7 can for example be avoided. Further, a change of the perceived volume caused by the change of the position and/or orientation of the seat 7 can also be compensated for. The differently perceived attenuation of various frequency portions can thus also be accounted for.

Thus, a more flexible control of the speakers 3 can be provided by the teachings herein.

LIST OF REFERENCE NUMERALS

1 Control system
2 Motor vehicle
3 Speaker
4 Communication interface
5 Server computing unit
6 Control unit
7 Seat
8 Seating surface
9 Backrest
10 Rotational axis
11 Sensor system The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a plurality of acoustic signal transmitters of a motor vehicle, comprising:

obtaining advance booking information from an external processor using a control system of the motor vehicle, wherein the advance booking information is in the context of reserving the motor vehicle and comprises passenger information;

deactivating a first part of the plurality of acoustic signal transmitters depending on the advance booking information using the control system;

generating a control signal using the control system for each of the acoustic signal transmitters of a second part of acoustic signal transmitters of the plurality of acoustic signal transmitters, which includes at least two of the plurality of acoustic signal transmitters, to generate an acoustic output.

2. The method of claim 1, wherein the control signals are generated depending on the advance booking information and/or depending on a preset sound profile.

3. The method of claim 2, comprising:

generating at least one sensor signal depending on a position and/or orientation of a seat of the motor vehicle using a sensor system of the motor vehicle; and generating the control signals depending on the at least one sensor signal.

4. The method of claim 1, comprising:

generating at least one sensor signal depending on a position and/or orientation of a seat of the motor vehicle using a sensor system of the motor vehicle; and generating the control signals depending on the at least one sensor signal.

5. The method of claim 4, comprising:

generating a rotary encoder signal depending on a rotational position of the seat by a rotary encoder of the sensor system; and generating the control signals depending on the rotary encoder signal.

6. The method of claim 5, wherein the rotational position corresponds to a rotational angle around a rotational axis, which is at least approximately parallel to a vehicle vertical axis of the motor vehicle.

7. The method of claim 6, comprising:

generating a seat occupancy sensor signal depending on a seat occupancy of the seat by a seat occupancy sensor of the motor vehicle; and generating the control signals depending on the seat occupancy sensor signal.

8. The method of claim 5, comprising:

generating image data, which represents the seat at least partially, using a camera system of the motor vehicle; and generating the control signals depending on the image data.

9. The method of claim 5, comprising:

generating image data, which represents the seat at least partially, using a camera system of the motor vehicle; and generating the control signals depending on the image data.

10. The method of claim 5, comprising:

generating a seat occupancy sensor signal depending on a seat occupancy of the seat by a seat occupancy sensor of the motor vehicle; and generating the control signals depending on the seat occupancy sensor signal.

11. The method of claim 4, comprising:

generating image data, which represents the seat at least partially, using a camera system of the motor vehicle; and generating the control signals depending on the image data.

12. The method of claim 11, comprising:

generating a seat occupancy sensor signal depending on a seat occupancy of the seat by a seat occupancy sensor of the motor vehicle; and generating the control signals depending on the seat occupancy sensor signal.

13. The method of claim 4, comprising:

generating a seat occupancy sensor signal depending on a seat occupancy of the seat by a seat occupancy sensor of the motor vehicle; and generating the control signals depending on the seat occupancy sensor signal.

14. The method of claim 1, comprising:

generating a rotary encoder signal depending on a rotational position of the seat by a rotary encoder of the sensor system; and generating the control signals depending on the rotary encoder signal.

15. The method of claim 14, wherein the rotational position corresponds to a rotational angle around a rotational axis, which is at least approximately parallel to a vehicle vertical axis of the motor vehicle.

16. A control system for a motor vehicle with a plurality of acoustic signal transmitters, wherein the control system comprises a communication interface, which is configured to obtain advance booking information from an external processor, wherein the advance booking information is in the context of reserving the motor vehicle and comprises passenger information;

the control system comprises at least one controller, which is configured to deactivate a first part of the plurality of acoustic signal transmitters depending on the advance booking information; and the at least one controller is configured to generate a control signal for each of the acoustic signal transmitters of a second part of acoustic signal transmitters of the plurality of acoustic signal transmitters, which includes at least two of the plurality of acoustic signal transmitters, to generate an acoustic output.

17. The control system of claim 16, wherein the control system comprises a sensor system, which is configured to generate at least one sensor signal depending on a position and/or orientation of a seat of the motor vehicle; and the at least one controller-unit is configured to generate the control signals depending on the at least one sensor signal.

18. A motor vehicle with a plurality of acoustic signal transmitters and a control system of claim 16.

19. A method for operating a plurality of acoustic signal transmitters of a motor vehicle, comprising:

obtaining booking information from an external processor using a control system of the motor vehicle;

deactivating a first part of the plurality of acoustic signal transmitters depending on the booking information using the control system;

generating at least one sensor signal depending on a position and/or orientation of a seat of the motor vehicle using a sensor system of the motor vehicle; and generating a control signal using the control system based on the at least one sensor signal for each of the acoustic signal transmitters of a second part of acoustic signal transmitters of the plurality of acoustic signal transmitters, which includes at least two of the plurality of acoustic signal transmitters, to generate an acoustic output.

\* \* \* \* \*